United States Patent
Matsui et al.

(10) Patent No.: US 7,582,389 B2
(45) Date of Patent: Sep. 1, 2009

(54) NON-AQUEOUS ELECTROLYTE SECONDARY BATTERY

(75) Inventors: Tooru Matsui, Osaka (JP); Masaki Deguchi, Osaka (JP); Hiroshi Yoshizawa, Osaka (JP)

(73) Assignee: Panasonic Corporation, Osaka (JP)

( * ) Notice: Subject to any disclaimer, the term of this patent is extended or adjusted under 35 U.S.C. 154(b) by 202 days.

(21) Appl. No.: 11/575,286

(22) PCT Filed: Aug. 29, 2005

(86) PCT No.: PCT/JP2005/015653

§ 371 (c)(1),
(2), (4) Date: Mar. 14, 2007

(87) PCT Pub. No.: WO2006/030624

PCT Pub. Date: Mar. 23, 2006

(65) Prior Publication Data

US 2007/0243463 A1     Oct. 18, 2007

(30) Foreign Application Priority Data

Sep. 14, 2004   (JP) .............................. 2004-266385

(51) Int. Cl.
*H01M 6/16* (2006.01)
(52) U.S. Cl. ........................ 429/342; 429/332; 429/330; 429/331; 429/188; 429/201
(58) Field of Classification Search ................. 429/333, 429/330, 331, 188, 201, 342, 332
See application file for complete search history.

(56) References Cited

U.S. PATENT DOCUMENTS

| 6,475,680 | B1 | 11/2002 | Arai et al. |
| 6,605,385 | B2 | 8/2003 | Gan |
| 2004/0094741 | A1 | 5/2004 | Sato et al. |
| 2004/0249026 | A1 | 12/2004 | Tsuji et al. |

FOREIGN PATENT DOCUMENTS

| JP | 11260400 | 9/1999 |
| JP | 2001 229967 | 8/2001 |
| JP | 2002 352851 | 12/2002 |
| JP | 2002 373704 | 12/2002 |
| JP | 2004-26807 | 1/2004 |
| JP | 2004 071245 | 3/2004 |
| JP | 2004 227909 | 8/2004 |

OTHER PUBLICATIONS

Chinese Office Action dated Jul. 11, 2008 and English translation thereof.
Korean Office Action dated Aug. 11, 2008.
PCT International Search Report dated Nov. 29, 2005.

*Primary Examiner*—Laura S Weiner
(74) *Attorney, Agent, or Firm*—Dickinson Wright, PLLC (57) ABSTRACT

A non-aqueous electrolyte secondary battery including a positive electrode, a negative electrode and a non-aqueous electrolyte, wherein the non-aqueous electrolyte includes an onium compound, a lithium salt and a chain carbonate having a C=C unsaturated bond. The onium compound is preferably at least one selected from the group consisting of a chain quaternary ammonium compound, a pyrrolidinium compound and a piperidinium compound. The chain carbonate having a C=C unsaturated bond is preferably at least one selected from the group consisting of diallyl carbonate and allyl phenyl carbonate.

7 Claims, 2 Drawing Sheets

NON-AQUEOUS ELECTROLYTE SECONDARY BATTERY

TECHNICAL FIELD

The present invention relates to a non-aqueous electrolyte secondary battery, and particularly relates to an improvement for a non-aqueous electrolyte for improving the electrode reaction characteristics.

BACKGROUND ART

The positive electrode and the negative electrode of non-aqueous electrolyte secondary batteries include a compound capable of absorbing and desorbing lithium ion in the process of charge/discharge, and have high energy density. In recent years, among non-aqueous electrolyte secondary batteries, the sale of lithium ion batteries is increasing, and improvements thereof also have been continued vigorously.

An electrolyte in which a solute is dissolved in a non-aqueous solvent (organic solvent) is used as the electrolyte used for non-aqueous electrolyte secondary batteries. For example, organic solvents such as a cyclic carbonate (cyclic carbonic acid ester), a chain carbonate (chain carbonic acid ester) and a cyclic carboxylic acid ester are used as the non-aqueous solvent.

However, the non-aqueous electrolyte containing an organic solvent as its main component has inflammability. Therefore, the challenge has been the improvement of the battery safety. For example, a protective circuit for inhibiting the overcharge or overdischarge of the battery is used in order to ensure the safety.

In order to avoid the above-described problem of inflammability of the electrolyte, it has also been proposed to use a room temperature molten salt as the solvent of the electrolyte. A room temperature molten salt is a liquid at an ordinary temperature, has a very low vapor pressure, and tends not to burn. For example, an electrolyte that includes 1-methyl-3-ethylimidazolium tetrafluoroborate ($MEI.BF_4$) as the room temperature molten salt and $LiBF_4$ as the solute has been proposed. This electrolyte further includes ethylene carbonate (EC), which is a chain carbonate, or dimethyl carbonate (DMC), which is a cyclic carbonate, to the extent that the nonflammability is not impaired (see Patent Document 1). Further, an electrolyte in which a cyclic carbonate having a C=C unsaturated bond is mixed with $MEI.BF_4$ has also been disclosed (see Patent Document 2).

The reason for mixing a cyclic or chain carbonate, or a cyclic carbonate having a C=C unsaturated bond with the room temperature molten salt serving as the solvent lies in the suppression of the decomposition of the room temperature molten salt. For example, $MEI.BF_4$ tends to be reductively decomposed in a negative electrode having a potential of not more than 1 V with respect to the redox potential of lithium. Such a decomposition of the room temperature molten salt can be suppressed with a film formed on the negative electrode by a cyclic or chain carbonate, or a cyclic carbonate having a C=C unsaturated bond.

In addition, the room temperature molten salt has high viscosity. Therefore, improving the performance at high load of the battery by reducing the viscosity of the electrolyte is another reason for mixing the organic solvent with the room temperature molten salt.

Patent Document 1 Japanese Laid-Open Patent Publication No. Hei 11-260400

Patent Document 2 Japanese Laid-Open Patent Publication No. 2002-373704

DISCLOSURE OF THE INVENTION

Problem to be Solved by the Invention

However, problems occur when the electrolyte is prepared by mixing a cyclic or chain carbonate, or a cyclic carbonate having a C=C unsaturated bond with the room temperature molten salt. When a non-aqueous electrolyte secondary battery including such an electrolyte is held in a high voltage state or stored at a high temperature, the amount of gas generation increases, or the charge/discharge cycle life is shortened. This seems to be because the film formed on the negative electrode is gradually dissolved into the electrolyte, and oxidatively decomposed on the positive electrode. In this case, a film is formed again on the portion of the negative electrode at which the film has been dissolved. Accordingly, gas is also generated on the negative electrode. In addition, gas is also generated by the electrolyte components oxidatively decomposed directly on the positive electrode.

It is an object of the present invention to maintain the capacity characteristics of the non-aqueous electrolyte secondary battery for a high load, and suppress the oxidative decomposition of the electrolyte components on a positive electrode that have been brought into a high potential state. This improves the reliability of the non-aqueous electrolyte secondary battery when held in a high voltage state or stored at a high temperature.

Means for Solving the Problem

The present invention relates to a non-aqueous electrolyte secondary battery including a positive electrode, a negative electrode and a non-aqueous electrolyte, wherein the non-aqueous electrolyte includes an onium compound, a lithium salt and a chain carbonate having a C=C unsaturated bond.

Here, as the onium compound, it is possible to use, for example, a chain quaternary ammonium compound, a pyrrolidinium compound, a piperidinium compound, a sulfonium compound, and a phosphonium compound. These may be used singly, or two or more of them may be used in combination.

In the chain carbonate having a C=C unsaturated bond, the C=C unsaturated bond refers to an unsaturated bond of a vinyl group, an allyl group or an aryl group, for example.

As the chain carbonate having a C=C unsaturated bond, it is preferable to use diallyl carbonate or allyl phenyl carbonate, for example.

Particularly, when a significant suppression of the amount of gas generation is desired, it is preferable to use diphenyl carbonate as the chain carbonate having a C=C unsaturated bond.

From the viewpoint of suppressing the oxidative decomposition of the electrolyte on the positive electrode even further, the non-aqueous electrolyte may further include a cyclic carbonate having a C=C unsaturated bond. In the cyclic carbonate having a C=C unsaturated bond, the C=C unsaturated bond refers to an unsaturated bond of a vinyl group, an allyl group or an aryl group, for example.

As the cyclic carbonate having a C=C unsaturated bond, it is possible to use vinylene carbonate, vinyl ethylene carbonate, divinyl ethylene carbonate, phenyl ethylene carbonate and diphenyl ethylene carbonate, for example.

However, in the case of using diphenyl carbonate as the chain carbonate having a C=C unsaturated bond, it is possible to sufficiently suppress the oxidative decomposition of the electrolyte on the positive electrode, without using the cyclic carbonate having a C=C unsaturated bond.

The non-aqueous electrolyte may further include a cyclic carbonate having no C═C unsaturated bond and/or a cyclic carboxylic acid ester. As the cyclic carbonate having no C═C unsaturated bond, it is possible to use ethylene carbonate, propylene carbonate and butylene carbonate, for example. As the cyclic carboxylic acid ester, it is possible to use γ-butyrolactone and γ-valerolactone, for example.

The reason that the inclusion of the chain carbonate having a C═C unsaturated bond in the non-aqueous electrolyte including an onium compound improves the performance at high load of the non-aqueous electrolyte secondary battery, or suppresses the oxidative decomposition of the electrolyte components on the positive electrode is inferred as follows.

First, even if the potential of the positive electrode increases to, for example, about 4.3 to 4.5 V, a film is formed on the positive electrode by oxidative polymerization of the chain carbonate having a C═C unsaturated bond. Accordingly, it is possible to suppress the oxidative decomposition of the electrolyte components such as an onium compound.

Second, the viscosity of the electrolyte including an onium compound is reduced by including therein the non-cyclic carbonate having a C═C unsaturated bond, thus facilitating the ion diffusion in the positive electrode. Consequently, it is possible to prevent an overcharged state from occurring in the vicinity of the surface of the positive electrode. Accordingly, the capacity characteristics at high load can be maintained. Additionally, when the viscosity of the electrolyte is high, the ion migration in the positive electrode becomes difficult. As a result, only the portion of the positive electrode that is in the vicinity of the surface contributes to the battery reaction. Accordingly, when the battery is continued to be charged, the portion of the positive electrode that is in the vicinity of the surface is brought into an overcharged state.

It should be noted that a carbonic acid gas tends to be generated when the cyclic carbonate having a C═C unsaturated bond is used, without using the non-cyclic carbonate having a C═C unsaturated bond. Further, since the cyclic carbonate having a C═C unsaturated bond has higher viscosity than the non-cyclic carbonate having a C═C unsaturated bond, it is difficult to improve the performance at high load.

On the other hand, when the non-cyclic carbonate having a C═C unsaturated bond and the cyclic carbonate having a C═C unsaturated bond are used simultaneously, the gas generation due to the oxidative decomposition on the positive electrode can be suppressed even further. It seems that, when the non-cyclic carbonate and the cyclic carbonate each having a C═C unsaturated bond are used simultaneously, a relatively strong film is formed on the negative electrode by copolymerization. Accordingly, the dissolution of the film from the negative electrode can be suppressed. Further, it seems that the cyclic carbonate having a C═C unsaturated bond absorbs some amount of a hydrogen gas generated from the film formed on the positive electrode.

Effect of the Invention

The present invention firstly makes it possible to prevent oxidative decomposition of the electrolyte components (i.e., an onium compound, various carbonates, or matter dissolved from the film formed on the negative electrode) on the positive electrode having a high potential. Furthermore, it secondly makes it possible to suppress the decrease of the battery capacity at high load. Accordingly, it is possible to provide a non-aqueous electrolyte secondary battery having excellent reliability.

BEST MODE FOR CARRYING OUT THE INVENTION

One feature of the non-aqueous secondary battery according to the present invention lies in that it includes a positive electrode, a negative electrode and a non-aqueous electrolyte, wherein the non-aqueous electrolyte includes an onium compound, a lithium salt and a chain carbonate having a C═C unsaturated bond.

Although the onium compound is preferably a liquid at an ordinary temperature (for example, 25° C.), an onium compound that is not a liquid at an ordinary temperature can also be used in the present invention, if the whole electrolyte assumes a liquid state by mixing that onium compound with another liquid component. It should be noted that an onium compound that is a liquid at an ordinary temperature may also be called a room temperature molten salt.

Although it is possible to use, for example, a chain quaternary ammonium compound, a pyrrolidinium compound, a piperidinium compound, a sulfonium compound and a phosphonium compound may be used as the onium compound, the onium compound is not limited to these. One of these onium compounds may be used singly, or two or more of them may be used in combination.

The onium compound comprises a cation and an anion.

The chain quaternary ammonium compound refers to a compound having a chain quaternary ammonium ion (cation). In the chain quaternary ammonium ion, a nitrogen atom does not form a ring structure. The chain quaternary ammonium ion can be represented by $(NR^1R^2R^3R^4)^+$. Here, $R^1$ to $R^4$ are each independently a chain hydrocarbon group. The chain hydrocarbon group may be, for example, an alkyl group having 1 to 4 carbon atoms, or an alkoxy group having 1 to 4 carbon atoms, but it is not limited to these. The chain quaternary ammonium compound is effective particularly in suppressing gas generation.

The pyrrolidinium compound refers to a compound having a cation with a valence of covalent bond of 4 that is formed by the nitrogen atom of pyrrolidine and two alkyl groups, aryl groups or the like bonded thereto. An alkyl group having 1 to 4 carbon atoms is preferable as the alkyl group bonded to the nitrogen atom, and a phenyl group is preferable as the aryl group.

The piperidinium compound refers to a compound having a cation with a valence of covalent bond of 4 that is formed by the nitrogen atom of piperidine and two alkyl groups, aryl group, or the like bonded thereto. An alkyl group having 1 to 4 carbon atoms is preferable as the alkyl group bonded to the nitrogen atom, and a phenyl group is preferable as the aryl group.

The sulfonium compound refers to a compound having a cation with a valence of covalent bond of 3 that is formed by a sulfur atom and an alkyl group, aryl group, or the like bonded thereto. An alkyl group having 1 to 4 carbon atoms is preferable as the alkyl group bonded to the sulfur atom, and a phenyl group or the like is preferable as the aryl group.

The phosphonium compound refers to a compound having a cation with a valence of covalent bond of 4 that is formed by a phosphorus atom and an alkyl group, aryl group or the like bonded thereto. An alkyl group having 1 to 4 carbon atoms is preferable as the alkyl group bonded to the phosphorus atom, and a phenyl group is preferable as the aryl group.

Although there is no particular limitation with respect to the anion of the onium compound, it is preferable to use a fluoride anion, and it is possible to use, for example, tetrafluoroborate ion ($BF_4^-$), hexafluorophosphate ion ($PF_6^-$), $C(CF_3SO_2)_3^-$, and $N(CF_3SO_2)_2^-$. Among them, $BF_4^-$ is preferable in that it can provide an electrolyte having a high molarity.

Among onium compounds, it is particularly preferable to use at least one selected from the group consisting of a chain quaternary ammonium compound, a pyrrolidinium compound and a piperidinium compound, in terms of a particularly small amount of gas generation. The at least one selected from the group consisting of a chain quaternary ammonium compound, a pyrrolidinium compound and a piperidinium compound constitutes preferably 80 to 100 mol %, particularly preferably 100% of the whole onium compound.

Examples of the chain carbonate having a C═C unsaturated bond include methyl vinyl carbonate (MVC), ethyl vinyl carbonate (EVC), divinyl carbonate (DVC), allyl methyl carbonate (AMC), allyl ethyl carbonate (AEC), diallyl carbonate (DAC) and allyl phenyl carbonate (APC). These may be used singly, or two or more of them may be used in combination. Among them, DAC and APC are particularly preferable, in terms of a particularly small amount of gas generation.

From the viewpoint of suppressing the oxidative decomposition of the electrolyte on the positive electrode even further especially when the battery is stored at a high temperature, the non-aqueous electrolyte may further include a cyclic carbonate having a C═C unsaturated bond. Examples of the cyclic carbonate having a C═C unsaturated bond include vinylene carbonate (VC), vinyl ethylene carbonate (VEC), divinyl ethylene carbonate (DVEC) and phenyl ethylene carbonate (PEC). These may be used singly, or two or more of them may be used in combination. Among them, VEC and PEC are particularly preferable, in terms of a particularly small amount of gas generation.

It is particularly preferable to use diphenyl carbonate (DPC) as the chain carbonate having a C═C unsaturated bond when a significant suppression of the amount of gas generation is desired. Diphenyl carbonate has a particularly great effect of suppressing the amount of gas generation. Such a peculiarity of diphenyl carbonate seems to be related to the favorable adsorptivity of the phenyl group to the electrode.

Diphenyl carbonate may be used simultaneously with another chain carbonate having a C═C unsaturated bond. However, from the viewpoint of achieving a significant effect of suppressing the amount of gas generation, diphenyl carbonate constitutes preferably 50 to 100 mol %, more preferably 100% of the whole chain carbonate having a C═C unsaturated bond.

When the non-aqueous electrolyte includes diphenyl carbonate, it is not necessary to use the cyclic carbonate having a C═C unsaturated bond in order to suppress the oxidative decomposition of the electrolyte on the positive electrode even further. When the non-aqueous electrolyte includes diphenyl carbonate and the cyclic carbonate having a C═C unsaturated bond simultaneously, it is also preferable that the amount of the cyclic carbonate having a C═C unsaturated bond is small, preferably equimolar or less, with respect to 1 mol of diphenyl ethylene carbonate.

From the viewpoint of improving the cycle characteristics, the non-aqueous electrolyte may further include various other non-aqueous solvents, including, for example, a cyclic carbonate having no C═C unsaturated bond or a cyclic carboxylic acid ester. As the cyclic carbonate having no C═C unsaturated bond, it is possible to use, for example, ethylene carbonate, propylene carbonate and butylene carbonate. As the cyclic carboxylic acid ester, it is possible to use, for example, γ-butyrolactone and γ-valerolactone. These may be used singly, or two or more of them may be used in combination.

In addition, it is also possible to use a small amount of a chain carbonate having no C═C unsaturated bond (for example, dimethyl carbonate (DMC), diethyl carbonate (DEC), ethylmethyl carbonate (EMC) or dipropyl carbonate (DPC)), a chain carboxylic acid ester (for example, methyl formate, methyl acetate, methyl propionate or ethyl propionate), a chain ether (for example, 1,2-dimethoxyethane (DME), 1,2-diethoxy ethane (DEE) or ethoxymethoxyethane (EME)), and a cyclic ether (for example, tetrahydrofuran or 2-methyltetrahydrofuran). These may be used singly, or two or more of them may be used in combination.

Further, it is also possible to use a small amount of dimethyl sulfoxide, 1,3-dioxolane, formamide, acetamide, dimethylformamide, dioxolane, acetonitrile, propylnitrile, nitromethane, ethyl monoglyme, phosphoric acid triester, trimethoxymethane, a dioxolane derivative, sulfolane, methylsulfolane, 1,3-dimethyl-2-imidazolidinone, 3-methyl-2-oxazolidinone, 1,3-propanesultone, anisole, dimethyl sulfoxide, N-methyl-2-pyrrolidone and the like. These may be used singly, or two or more of them may be used in combination.

The amount of the chain carbonate having a C═C unsaturated bond that is included in the non-aqueous electrolyte is preferably about 0.01 to 0.5 mol, more preferably 0.05 to 0.2 mol, with respect to 1 mol of the onium compound. When the amount of the chain carbonate having a C═C unsaturated bond is less than 0.01 mol, the effect of suppressing the oxidative decomposition of the electrolyte components on the positive electrode is reduced, and when it exceeds 0.5 mol, the effect of suppressing the gas generation may not be achieved on the contrary.

When the non-aqueous electrolyte does not include diphenyl carbonate, the amount of the cyclic carbonate having a C═C unsaturated bond that is included in the non-aqueous electrolyte is preferably about 0.005 to 0.3 mol, more preferably 0.02 to 0.2 mol, with respect to 1 mol of the onium compound. While no problem arises when the amount of the cyclic carbonate having a C═C unsaturated bond is less than 0.005 mol, the effect of suppressing the oxidative decomposition of the electrolyte components on the positive electrode even further cannot be achieved, and when it exceeds 0.3 mol, the effect of suppressing the gas generation may not be achieved on the contrary On the other hand, when the non-aqueous electrolyte includes diphenyl carbonate, the amount of the cyclic carbonate having a C═C unsaturated bond is about 0.005 to 0.3 mol, with respect to 1 mol of the onium compound, and preferably equimolar or less, with respect to 1 mol of diphenyl carbonate.

When the non-aqueous electrolyte includes other non-aqueous solvents that are not included in any of the categories of the onium compound, the chain carbonate having a C═C unsaturated bond and the cyclic carbonate having a C═C unsaturated bond, the total amount thereof is preferably not more than 6 mol, with respect to 1 mol of the onium compound. When the amount of other non-aqueous solvents is large, the effect of suppressing the decomposition of the electrolyte components on the positive electrode, or the viscosity of the non-aqueous electrolyte may be affected. For example, the amount of the cyclic carbonate having no C=C unsaturated bond is preferably not more than 4 mol, with respect to 1 mol of the onium compound, the amount of the cyclic carboxylic acid ester is preferably not more than 4 mol, with respect to 1 mol of the onium compound, and the amount of the chain carbonate having no C=C unsaturated bond is preferably not more than 2 mol, with respect to 1 mol of the onium compound.

While there is no particular limitation with respect to the lithium salt included in the non-aqueous electrolyte, examples thereof include $LiPF_6$, $LiBF_4$, $LiClO_4$, $LiAlCl_4$, $LiSbF_6$, LiSCN, LiCl, $LiCF_3SO_3$, $LiCF_3CO_2$, $Li(CF_3SO_2)_2$, $LiAsF_6$, $LiN(CF_3SO_2)_2$, $LiB_{10}C_{10}$, LiCl, LiBr, LiI, chloroboran lithium, lithium tetraphenylborate and lithium lower aliphatic carboxylate. These may be used singly, or two or more of them may be used in combination. Among them, it is particularly preferable to use $LiPF_6$ or $LiBF_4$.

Although the concentration of lithium salt in the non-aqueous electrolyte is not particularly limited, for example, it is preferably 0.05 to 1 mol, more preferably 0.2 to 0.4 mol, with respect to 1 mol of the onium compound.

The non-aqueous electrolyte is liquid at room temperature (25° C.), and the viscosity thereof is preferably 2 to 100 Pa·s, more preferably 2 to 10 Pa·s. According to the present invention, it is possible to obtain a non-aqueous electrolyte having a viscosity in the above-described range, while having a low vapor pressure and being flame resistant.

The non-aqueous electrolyte secondary battery according to the present invention has its feature in the non-aqueous electrolyte, and there is no particular limitation with respect to the components such as the positive electrode, the negative electrode and the separator. Further, the form of the non-aqueous electrolyte secondary battery of the present invention is also not limited, and the present invention is applicable, for example, to a coin-shaped battery, a laminate battery having a laminated electrode plate group, a cylindrical battery having a spiral electrode plate group and a square battery.

Figure 1:
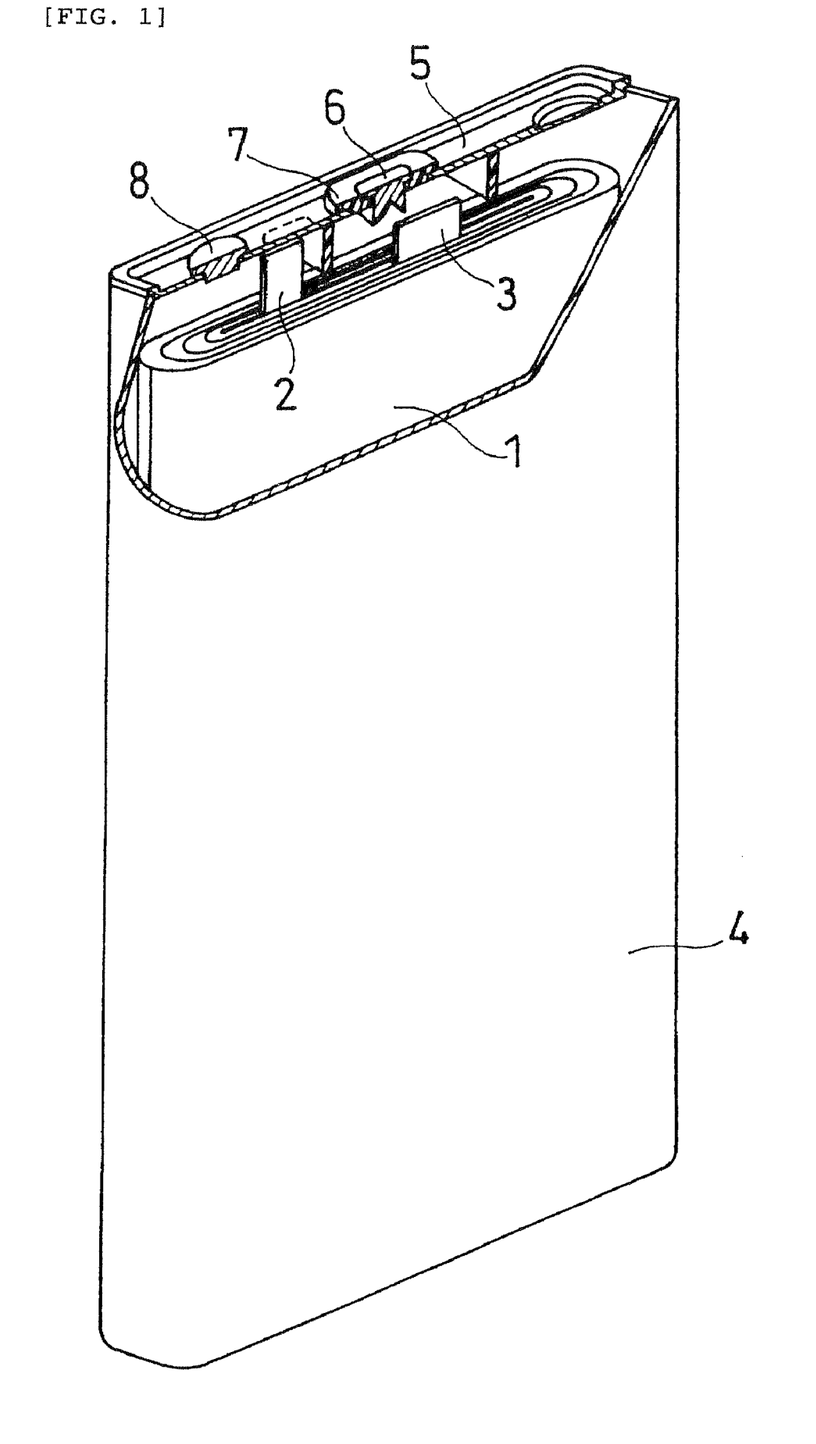
FIG. 1 is a partially cut-away perspective view of a square lithium ion secondary battery according to one embodiment of the present invention.

Next, an example of the non-aqueous electrolyte secondary battery according to the present invention is described with reference to the drawing. FIG. 1 is a vertical cross-sectional view showing a square lithium secondary battery.

A positive electrode and a negative electrode are wound with a separator interposed therebetween, thus constituting an electrode group 1. The electrode group 1 is housed in a square tubular battery case 4 having a bottom. The other end of negative electrode lead 3, one end of which is connected to the negative electrode, is connected via an upper insulating plate (not shown) to a rivet 6 located at the center of a sealing plate 5. The rivet 6 is insulated from the sealing plate 5 by an insulating gasket 7. A positive electrode lead 2, one end of which is connected to the positive electrode, is connected to the back surface of the sealing plate 5 via the upper insulating plate. The lower end of the electrode group 1 and the battery case 4 are insulated by a lower insulating plate, and the upper insulating plate insulates between the negative electrode lead 3 and the battery case 4, as well as between the electrode group 1 and the sealing plate 5.

The periphery of the sealing plate 5 is engaged with the opening end of the battery case 4, and the engaging portion is sealed and tightly closed by laser welding. A non-aqueous electrolyte injection port formed in the sealing plate 5 is covered with a sealing stopper 8, and sealed and tightly closed by laser welding.

The positive electrode can be formed, for example, by applying a positive electrode paste to one side or both sides of a 10 μm to 60 μm thick positive electrode current collector of a foil made of aluminum or an aluminum alloy, or such a foil that has been processed into a lath or subjected to etching, and drying it, followed by rolling to form a positive electrode active material layer. The positive electrode paste can be prepared by dispersing a positive electrode active material, a binder, a conductive agent, and, as necessary, a thickener in a dispersion medium. The positive electrode is provided with a plain portion having no active material layer, and the positive electrode lead is welded here.

While there is no particular limitation with respect to the positive electrode active material, it is possible to use, for example, a lithium-containing oxide capable of receiving lithium ion as a guest. For example, it is possible to use a composite metal oxide of at least one transition metal selected from the group consisting of cobalt, manganese, nickel, chromium, iron and vanadium with lithium, and a phosphoric acid compound such as $LiFePO_4$. Among them, $Li_xCoO_2$, $Li_xMnO_2$, $Li_xNiO_2$, $LiCrO_2$, $\alpha LiFeO_2$, $LiVO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$ (wherein, M=at least one selected from the group consisting of Na, Mg, Sc, Y, Mn, Fe, Co, Ni, Cu, Zn, Al, Cr, Pb, Sb and B, x=0 to 1.2, y=0 to 0.9, and z=2.0 to 2.3), a transition metal chalcogenide, a lithiated material of a vanadium oxide, a lithiated material of a niobium oxide, and the like are particularly preferable. These may be used singly, or two or more of them may be used in combination. It should be noted that the above-described value of "x" is increased or decreased by charge/discharge. The average particle diameter of the positive electrode active material is preferably 1 μm to 30 μm.

As the binder, the conductive agent and the thickener, which may be added as needed, that are used for the positive electrode paste, it is possible to use the ones similar to those that have been used conventionally.

Although there is no particular limitation with respect to the binder, as long as it can be dissolved or dispersed in the dispersion medium of the paste, it is possible to use, for example, a fluorine-based binder, acrylic rubber, modified acrylic rubber, styrene-butadiene rubber (SBR), an acrylic polymer, and a vinyl polymer. These may be used singly, or two or more of them may be used in combination. It should be noted that polyvinylidene fluoride, a copolymer of vinylidene fluoride and hexafluoropropylene, and polytetrafluoroethylene, for example, are preferable as the fluorine-based binder, and these can be used as a dispersion.

As the conductive agent, it is possible to use acetylene black, graphite, carbon fiber and the like. These may be used singly, or two or more of them may be used in combination.

An ethylene-vinyl alcohol copolymer, carboxymethyl cellulose, methyl cellulose and the like are preferable as the thickener.

As the dispersion medium, those in which the binder can be dissolved are suitable. For an organic medium, it is preferable to use N-methyl-2-pyrrolidone, N,N-dimethylformamide, tetrahydrofuran, dimethyl acetamide, dimethyl sulfoxide, hexamethylsulfonamide, tetramethylurea, acetone, methyl ethyl ketone and the like, singly or as a mixture. Further, for an aqueous medium, water and warm water are preferable.

Although there is no particular limitation with respect to the method of producing the positive electrode paste by dispersing the positive electrode active material, the binder, the conductive agent and the thickener, which is added as needed, in a dispersion medium, it is possible to use, for example, a planetary mixer, a homomixer, a pin mixer, a kneader and a homogenizer. These may be used singly, or two or more of them may be used in combination. It is also possible to add, as needed, various dispersing agents, surfactants, stabilizers or the like during kneading and dispersion of the positive electrode paste.

The positive electrode paste can be readily applied to the positive electrode current collector, for example, using a slit die coater, a reverse roll coater, a lip coater, a blade coater, a knife coater, a gravure coater or a dip coater. Although the positive electrode paste applied to the positive electrode current collector is preferably subjected to drying that is similar to natural drying, it is preferably dried at a temperature of 70° C. to 200° C. for 10 minutes to 5 hours, in view of the productivity.

Preferably, the rolling is carried out several times either with a linear pressure of 1000 to 2000 kg/cm or with varied linear pressures, using a roll press machine until the positive electrode plate has a predetermined thickness of 130 μm to 200 μm.

The negative electrode plate can be formed, for example, by applying a negative electrode paste to one side or both sides of a 10 μm to 50 μm thick negative electrode current collector comprising an ordinary copper foil, or a copper foil that has been processed into a lath or subjected to etching, and drying it, followed by rolling to form a negative electrode active material layer. The negative electrode paste can be prepared by dispersing a negative electrode active material, a binder, and, as necessary, a conductive agent and a thickener in a dispersion medium. The negative electrode is provided with a plain portion having no active material layer, and the negative electrode lead is welded here.

Although there is no particular limitation with respect to the negative electrode active material, it is preferable to use a carbon material capable of desorbing and absorbing lithium ion through charge and discharge. For example, a carbon material obtained by baking an organic polymer compound (e.g., phenol resin, polyacrylonitrile or cellulose), a carbon material obtained by baking coke or pitch, artificial graphite, natural graphite, pitch-based carbon fiber and PAN-based carbon fiber are preferable, and those having a fibrous, spherical, flaky or massive form can be used.

As the binder, and the conductive agent and the thickener, which are used as needed, it is possible to use the ones similar to those that have been used conventionally. For example, it is possible to use the binder, the conductive agent, and the thickener that are used for the positive electrode plate.

As the separator, it is preferable to use a microporous film comprising a polymer such as polyethylene, polypropylene, polyvinylidene fluoride, polyvinylidene chloride, polyacrylonitrile, polyacrylamide, polytetrafluoroethylene, polysulfone, polyether sulfone, polycarbonate, polyamide, polyimide, polyether (polyethylene oxide or polypropylene oxide), cellulose (carboxymethyl cellulose or hydroxy propyl cellulose), poly(meth)acrylic acid or poly(meth)acrylic acid ester. It is also possible to use a multilayer film in which these microporous films are stacked. Among them, a microporous film comprising polyethylene, polypropylene, polyvinylidene fluoride or the like is preferable, and the thickness thereof is preferably 10 μm to 30 μm.

Next, the present invention is described specifically by way of examples, but the present invention is not limited to the following examples.

EXAMPLE 1

(i) Preparation of Non-Aqueous Electrolyte

N,N-diethyl-N-methyl-N-(2-methoxyethyl)ammonium tetrafluoroborate (DEME.BF$_4$) was used as the onium compound. This borate was a liquid at room temperature.

LiPF$_6$ was used as the lithium salt.

Diallyl carbonate (DAC) was used as the chain carbonate having a C=C unsaturated bond.

LiPF$_6$, DAC and DEME.BF$_4$ were weighed such that their molar ratio was 0.1/0.1/1, followed by mixing, thus forming a homogeneous non-aqueous electrolyte that was a liquid at room temperature.

(ii) Production of Positive Electrode

A positive electrode paste was prepared by dispersing, in dehydrated N-methyl-2-pyrrolidone (NMP), a positive electrode material mixture comprising 85 parts by weight of LiCoO$_2$ powder, 10 parts by weight of acetylene black serving as the conductive agent and 5 parts by weight of polyvinylidene fluoride serving as the binder. This positive electrode paste was applied onto a positive electrode current collector comprising an aluminum foil, dried and then rolled to form a positive electrode active material layer, thus obtaining a positive electrode sheet.

(iii) Production of Negative Electrode

A negative electrode paste was prepared by dispersing, in dehydrated NMP, a negative electrode material mixture comprising 75 parts by weight of artificial graphite powder, 20 parts by weight of acetylene black serving as the conductive agent and 5 parts by weight of polyvinylidene fluoride serving as the binder. This negative electrode paste was applied onto a negative electrode current collector comprising a copper foil, dried and then rolled to form a negative electrode active material layer, thus obtaining a negative electrode sheet.

(iv) Production of Reference Electrode

A reference electrode was produced by spot welding a small piece of an expanded metal made of nickel to a nickel lead, and pressure-bonding a lithium foil to the expanded metal portion.

(v) Assembly of Test Battery

The positive electrode sheet and the negative electrode sheet respectively were cut out into a positive electrode and a negative electrode each having a size of 35 mm×35 mm, and were ultrasonically welded respectively to an aluminum plate and a copper plate each including a lead wire. The positive electrode active material layer fixed to the aluminum plate and the negative electrode active material layer fixed to the copper plate were disposed facing each other with nonwoven fabric made of polypropylene interposed therebetween, and the whole was fixed with a tape to form an electrode plate group. The obtained electrode plate group was housed in a tubular case comprising an aluminum laminate sheet, and the reference electrode was inserted into a gap between the electrode plate group and the tubular case. Thereafter, with the lead portions of the positive electrode, the negative electrode and the reference electrode being extended to the outside, one opening of the tubular case was welded, and the non-aqueous electrolyte was injected from the other opening.

After the test battery assembled as described above was degassed for 5 seconds under an atmosphere of 10 mm Hg, the opening of the case on the electrolyte injection side was sealed by welding. The design capacity of the test battery was 35 mAh.

COMPARATIVE EXAMPLE 1

A test battery was assembled in the same manner as in Example 1, except that DAC was not included in the non-aqueous electrolyte.

Evaluation 1

Figure 2:
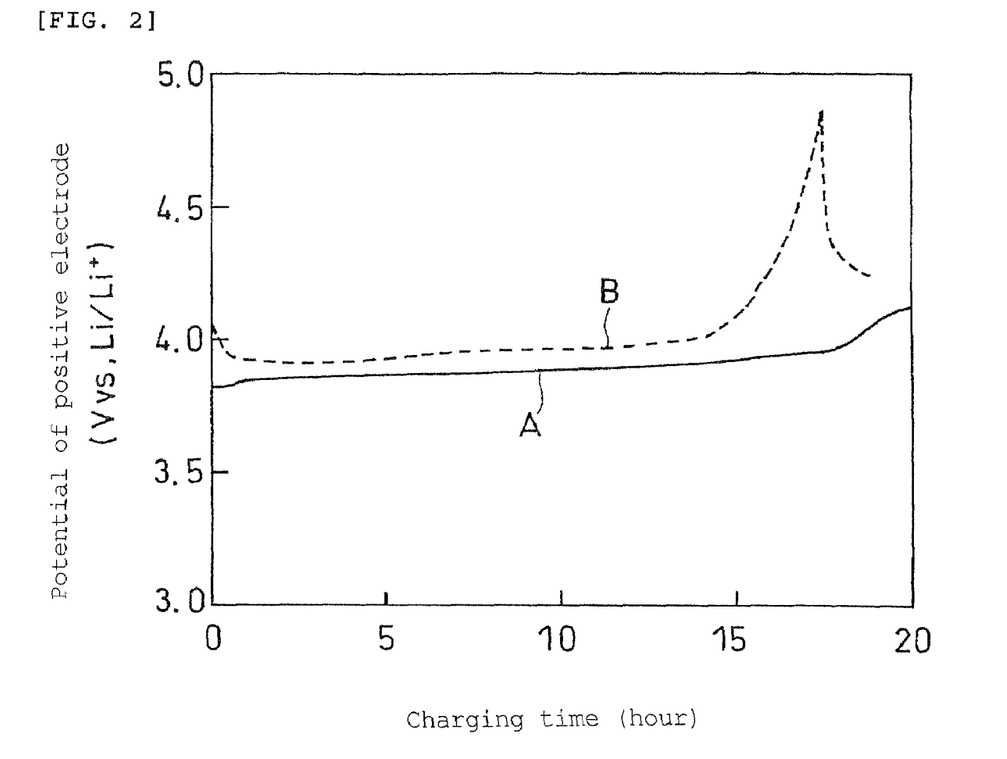
FIG. 2 is a graph showing curve A plotting the potential change of a positive electrode in a test battery of Example 1, and curve B plotting the potential change of a positive electrode in a test battery of Comparative Example 1.

The test batteries of Example 1 and Comparative Example 1 started to be charged with a constant current of 0.35 mA, and the potential change of the positive electrode was measured. FIG. 2 shows curve A plotting the potential change of the positive electrode in the test battery of Example 1, and curve B plotting the potential change of the positive electrode in the test battery of Comparative Example 1.

As shown in the curve B, the potential of the test battery of Comparative Example 1 rapidly increased from the moment when a charging time of 15 hours had elapsed, so that the charging was suspended due to the setting of the charging device. On the other hand, as shown in the curve A, the test battery of Example 1, which used the non-aqueous electrolyte including DAC, had a small polarization during charging, and the potential of the positive electrode did not increase rapidly. The reason seems to be that mixing of DAC reduced the viscosity of the non-aqueous electrolyte, thus decreasing the internal resistance and facilitating the oxidative polymerization of DAC on the positive electrode to suppress gas generation.

EXAMPLE 2

A test battery was assembled in the same manner as in Example 1, except that the reference electrode of a lithium foil was not inserted.

COMPARATIVE EXAMPLE 2A

A test battery was assembled in the same manner as in Example 2, except that dimethyl carbonate (DMC), which was the chain carbonate having no C=C unsaturated bond, was used in place of DAC. The composition in molar ratio of the non-aqueous electrolyte used here was $LiPF_6/DMC/DEME.BF_4$=0.1/0.1/1.

COMPARATIVE EXAMPLE 2B

A test battery was assembled in the same manner as in Example 2, except that DAC was not included in the non-aqueous electrolyte. The composition in molar ratio of the non-aqueous electrolyte used here was $LiPF_6/DEME.BF_4$=0.1/1.

Evaluation 2

The test batteries of Example 2, Comparative Example 2A and Comparative Example 2B were subjected to charging at 20° C. with a constant current of 0.35 mA. After the voltage of the batteries had reached 4.2 V, the batteries were held at 4.2 V for one week at 20° C.

After the batteries were stored in a high voltage state as described above, the amount of gas generated in each of the batteries was measured, and the composition of the gas was further analyzed. The results are shown in Table 1.

TABLE 1

| | Amount of gas generated in battery (Unit: mL) | | |
|---|---|---|---|
| | Example 2 | Com. Ex. 2A | Com. Ex. 2B |
| $CO_2$ | — | 0.089 | 0.004 |
| $C_2H_4$ | 0.022 | 0.024 | 0.067 |
| $C_2H_6$ | 0.009 | 0.015 | 0.023 |
| Total | 0.031 | 0.128 | 0.094 |

From Table 1, it is seen that the generation of $CO_2$, $C_2H_4$ and $C_2H_6$ was suppressed in the test battery of Example 2. The reason seems to be that the DAC mixed with the non-aqueous electrolyte was oxidatively polymerized on the surface of the positive electrode in the early stage of charging and formed a film, so that the oxidative decomposition of the remaining electrolyte components (for example, $DEME.BF_4$) was suppressed.

On the other hand, in the case of the test battery of Comparative Example 2A, the film formed on the surface of the negative electrode by dimethyl carbonate was dissolved into the non-aqueous electrolyte during storage in a high voltage state and oxidized in the positive electrode, thus increasing the amount of generation of $CO_2$. Further, in the case of the test battery of Comparative Example 2B, it seems that $DEME.BF_4$ was subjected to oxidative decomposition on the positive electrode, thus increasing the amount of generation of $C_2H_4$ and $C_2H_6$. It should be noted that DEME tends not to be reduced on the negative electrode. Therefore, it seems that DEME was oxidatively decomposed on the positive electrode.

EXAMPLE 3

(i) Preparation of Non-Aqueous Electrolyte

The following were used as the onium compound.

$DEME.BF_4$: N,N-diethyl-N-methyl-N-(2-methoxyethyl) Ammonium tetrafluoroborate $TEMA.BF_4$: N,N,N-triethyl-N-methyl-ammonium tetrafluoroborate $P14.BF_4$: N-butyl-N-methyl-pyrrolidinium tetrafluoroborate $PP13.BF_4$: N-propyl-N-methyl-piperidinium tetrafluoroborate $TBS.BF_4$: tributylsulfonium tetrafluoroborate $TBP.BF_4$: tetrabutylphosphonium tetrafluoroborate Non-aqueous electrolytes having compositions in molar ratio of $LiBF_4/EC/DAC$/onium salt=0.2/3.9/0.1/1 were prepared, using one of the above-described onium salts, DAC as the chain carbonate having a C=C unsaturated bond, and $LiBF_4$ as the lithium salt, and further adding ethylene carbonate (EC) as the cyclic carbonate having no C=C unsaturated bond.

(ii) Assembly of Test Batteries

Test batteries were assembled in the same manner as in Example 1, except that above-described non-aqueous electrolytes were used, and that a lithium foil having a thickness of 300 μm was used as the negative electrode, without using the reference electrode comprising a lithium foil.

COMPARATIVE EXAMPLE 3

A test battery was assembled in the same manner as in Example 3, except that DAC was not included in the non-aqueous electrolyte, and that the composition of the non-aqueous electrolyte in molar ratio was $LiBF_4/EC/DEME.BF_4=0.2/4/1$.

Evaluation 3

The test batteries of Example 3 and Comparative Example 3 were subjected to charging at 60° C. with a constant current of 0.35 mA. After the voltage of the batteries had reached 4.3 V, the batteries were held at 4.3 V for one week at 60° C.

After the batteries were stored in a high voltage state as described above, the amount of gas generated in each of the batteries was measured, and the composition of the gas was further analyzed. The results are shown in Table 2.

TABLE 2

| | | Amount of gas generated in battery (Unit: mL) | | | |
|---|---|---|---|---|---|
| | | $CO_2$ | $C_2H_4$ | $C_2H_6$ | Total |
| Example 3 | DEME.BF4 | 0.15 | 0.03 | 0.07 | 0.25 |
| | TEMA.BF4 | 0.13 | 0.01 | 0.06 | 0.20 |
| | P14.BF4 | 0.18 | 0.02 | 0.02 | 0.22 |
| | PP13.BF4 | 0.19 | 0.01 | 0.02 | 0.22 |
| | TBS.BF4 | 0.29 | 0.02 | 0.03 | 0.34 |
| | TBP.BF4 | 0.34 | 0.02 | 0.05 | 0.41 |
| Com. Ex. 3 | DEME.BF4 | 0.26 | 0.06 | 0.19 | 0.51 |

From Table 2, it is seen that the amount of gas generation in the battery can be suppressed by including DAC in the non-aqueous electrolyte. Furthermore, it is seen that the effect of suppressing the amount of gas generation was greater when using, as the onium salt, a chain quaternary ammonium salt, a pyrrolidinium salt or a piperidinium salt, than when using a sulfonium salt or a phosphonium salt.

EXAMPLE 4

Non-aqueous electrolytes were prepared by mixing $LiBF_4$, DAC and $DEME.BF_4$ into the compositions (molar ratios) listed in Table 3. Test batteries were assembled in the same manner as in Example 2, except that the obtained non-aqueous electrolytes were used.

Evaluation 4

The test batteries of Example 4 were subjected to charging at 20° C. with a constant current of 0.35 mA. After the voltage of the batteries had reached 4.2 V, the batteries were held at 4.2 V for one week at 20° C.

After the batteries were stored in a high voltage state as described above, the amount of gas generated in each of the batteries was measured, and the composition of the gas was further analyzed. The results are shown in Table 3.

TABLE 3

| Composition | Amount of gas generated in battery (Unit: mL) | | | |
|---|---|---|---|---|
| $LiBF_4$/DAC/DEME.BF4 | $CO_2$ | $C_2H_4$ | $C_2H_6$ | Total |
| 0.1/0/1 | — | 0.067 | 0.023 | 0.090 |
| 0.1/0.01/1 | — | 0.029 | 0.011 | 0.040 |
| 0.1/0.05/1 | — | 0.024 | 0.011 | 0.035 |
| 0.1/0.1/1 | — | 0.022 | 0.009 | 0.031 |
| 0.1/0.2/1 | 0.003 | 0.023 | 0.010 | 0.036 |
| 0.1/0.5/1 | 0.008 | 0.024 | 0.010 | 0.042 |
| 0.1/1/1 | 0.036 | 0.026 | 0.013 | 0.075 |

From Table 3, it is seen that the amount of gas generation changed depending on the mixing ratio of DAC included in the non-aqueous electrolyte. The amount of the chain carbonate having a C═C unsaturated bond that is mixed with the non-aqueous electrolyte is preferably about 0.01 to 0.5 mol, with respect to 1 mol of the onium compound.

EXAMPLE 5

(i) Preparation of Non-Aqueous Electrolyte

The following were used as the chain carbonate having a C═C unsaturated bond.

| | |
|---|---|
| MVC: | methyl vinyl carbonate |
| EVC: | ethyl vinyl carbonate |
| DVC: | divinyl carbonate |
| AMC: | allyl methyl carbonate |
| AEC: | allyl ethyl carbonate |
| DAC: | diallyl carbonate |
| APC: | allyl phenyl carbonate |
| DPC: | diphenyl carbonate |

Non-aqueous electrolytes having compositions in molar ratio of $LiBF_4$/chain carbonate having a C═C unsaturated bond/P14.TFSI=0.1/0.05/1 were prepared, using one of the above-described chain carbonates having a C═C unsaturated bond, N-methyl-N-butyl-pyrrolidinium bis[trifluoromethanesulfonyl]imide (P14.TFSI) as the onium compound, and $LiBF_4$ as the lithium salt.

(ii) Assembly of Test Batteries

Test batteries were assembled in the same manner as in Example 2, except the above-described non-aqueous electrolytes were used.

COMPARATIVE EXAMPLE 5

A test battery was assembled in the same manner as Example 5, except that the chain carbonate having a C═C unsaturated bond was not included in the non-aqueous electrolyte, and that the composition of the non-aqueous electrolyte in molar ratio was $LiBF_4$/P14.TFSI=0.1/1.

Evaluation 5

The test batteries of Example 5 and Comparative Example 5 were subjected to charging at 20° C. with a constant current of 0.35 mA. After the voltage of the batteries had reached 4.2 V, the batteries were held at 4.2 V for one week at 20° C.

After the batteries were stored in a high voltage state as described above, the amount of gas generated in each of the batteries was measured, and the composition of the gas was further analyzed. The results are shown in Table 4.

TABLE 4

| | | Amount of gas generated in battery (Unit: mL) | | | |
|---|---|---|---|---|---|
| | | $CO_2$ | $C_2H_4$ | $C_2H_6$ | Total |
| Example 5 | MVC | — | 0.026 | 0.014 | 0.040 |
| | EVC | 0.005 | 0.026 | 0.012 | 0.043 |
| | DVC | — | 0.018 | 0.009 | 0.027 |
| | AMC | — | 0.023 | 0.010 | 0.033 |
| | AEC | 0.004 | 0.021 | 0.007 | 0.032 |
| | DAC | — | 0.015 | 0.006 | 0.021 |
| | APC | — | 0.011 | 0.004 | 0.015 |
| | DPC | — | 0.010 | 0.004 | 0.014 |
| Com. Ex. 5 | None | — | 0.044 | 0.018 | 0.062 |

From Table 4, it is seen that the gas generation was suppressed when the batteries were held at a constant voltage of 4.2 V, even in the test batteries in which various chain carbonates having a C═C unsaturated bond were mixed with the non-aqueous electrolyte.

Furthermore, it is seen that DPC had a particularly excellent effect of suppressing the gas generation, among the chain carbonates having a C═C unsaturated bond.

EXAMPLE 6A (i) Preparation of Non-Aqueous Electrolytes

Cyclic carbonates having a C═C unsaturated bond were further added to the non-aqueous electrolytes. The following were used as the cyclic carbonates having a C═C unsaturated bond.

| | |
|---|---|
| VC: | vinylene carbonate |
| VEC: | vinyl ethylene carbonate |
| DVEC: | divinyl ethylene carbonate |
| PEG: | phenyl ethylene carbonate |
| DPEC: | diphenyl ethylene carbonate |

Non-aqueous electrolytes having compositions in molar ratio of $LiBF_4$/EC/DAC/cyclic carbonate having a C═C unsaturated bond/TEMA.TFSI=0.4/3.8/0.1/0.1/1 were prepared, using N,N,N-triethyl-N-methyl-ammonium bis[trifluoromethanesulfonyl]imide) (TEMA.TFSI) as the onium compound, DAC as the chain carbonate having a C═C unsaturated bond, and $LiBF_4$ as the lithium salt, and further adding ethylene carbonate (EC) as the cyclic carbonate having no C═C unsaturated bond.

(ii) Assembly of Test Batteries

Test batteries were assembled in the same manner as in Example 3, except that the above-described non-aqueous electrolytes were used.

EXAMPLE 6B

A test battery was assembled in the same manner as in Example 6A, except that the cyclic carbonate having a C═C unsaturated bond was not included in the non-aqueous electrolyte, and that the composition of the non-aqueous electrolyte in molar ratio was $LiBF_4$/EC/DAC/TEMA.TFSI=0.4/3.9/0.1/1.

COMPARATIVE EXAMPLE 6

Test batteries were assembled in the same manner as in Example 6A, except that the chain carbonate having a C═C unsaturated bond was not included in the non-aqueous electrolytes, and that the composition of the non-aqueous electrolytes in molar ratio was $LiBF_4$/EC/cyclic carbonate having a C═C unsaturated bond/TEMA.TFSI=0.4/3.9/0.1/1.

Evaluation 6

The test batteries of Example 6A, Example 6B and Comparative Example 6 were subjected to charging at 20° C. with a constant current of 0.35 mA. After the voltage of the batteries had reached 4.3 V, each of the batteries was stored at 85° C. for three days under an open circuit condition.

After the batteries were stored in a high voltage state at a high temperature as described above, the amount of gas generated in each of the batteries was measured, and the composition of the gas was further analyzed. The results are shown in Table 5.

TABLE 5

| | | | Amount of gas generated in battery (Unit: mL) | | | | |
|---|---|---|---|---|---|---|---|
| | Chain | Cyclic | $H_2$ | $CO_2$ | $C_2H_4$ | $C_2H_6$ | Total |
| Example 6A | DAC | VC | 0.01 | 0.28 | 0.01 | 0.03 | 0.33 |
| | DAC | VEC | 0.03 | 0.11 | 0.02 | 0.04 | 0.20 |
| | DAC | DVEC | — | 0.08 | 0.01 | 0.03 | 0.12 |
| | DAC | PEC | 0.06 | 0.13 | 0.01 | 0.03 | 0.23 |
| | DAC | DPEC | 0.05 | 0.09 | 0.01 | 0.01 | 0.16 |
| Example 6B | DAC | — | 0.08 | 0.16 | 0.03 | 0.08 | 0.35 |
| Com. Ex. 6 | — | VC | 0.01 | 0.47 | 0.07 | 0.05 | 0.61 |
| | — | VEC | 0.01 | 0.19 | 0.04 | 0.08 | 0.32 |
| | — | DVEC | — | 0.14 | 0.03 | 0.07 | 0.24 |
| | — | PEC | 0.02 | 0.20 | 0.02 | 0.06 | 0.30 |
| | — | DPEC | 0.02 | 0.17 | 0.02 | 0.05 | 0.26 |

From Table 5, it is seen that further mixing of the cyclic carbonate having a C═C unsaturated bond to the non-aqueous electrolyte improved the effect of suppressing the amount of gas generation in the battery during storage at a high temperature. Among the cyclic carbonates having a C═C unsaturated bond, VEC, DVEC, PEC and DPEC showed particularly preferable results.

It is also seen that combined use of the chain carbonate having a C═C unsaturated bond and the cyclic carbonate having a C═C unsaturated bond provided a greater effect of suppressing the generation of a hydrogen gas in the battery, than single use of the chain carbonate having a C═C unsaturated bond.

Furthermore, it is seen that combined use of the chain carbonate having a C═C unsaturated bond and the cyclic carbonate having a C═C unsaturated bond provided a greater effect of suppressing the generation of $CO_2$, $C_2H_4$ and $C_2H_6$ in the battery, than single use of the cyclic carbonate having a C═C unsaturated bond.

EXAMPLE 7

Non-aqueous electrolytes were prepared by mixing $LiBF_4$, EC, DAC, VEC and TEMA.TFSI into the compositions (molar ratios) listed in Table 6. Test batteries were assembled in the same manner as in Example 3, except that the obtained non-aqueous electrolytes were used.

Evaluation 7

The test batteries of Example 7 were subjected to charging at 20° C. with a constant current of 0.35 mA. After the voltage of the batteries had reached 4.3 V, each of the batteries was stored at 85° C. for three days under an open circuit condition.

After the batteries were stored in a high voltage state at a high temperature as described above, the amount of gas generated in each of the batteries was measured, and the composition of the gas was further analyzed. The results are shown in Table 6.

TABLE 6

| Composition | Amount of gas generated in battery (Unit: mL) | | | | |
|---|---|---|---|---|---|
| $LiBF_4$/EC/DAC/VEC/TEMA.TFSI | $H_2$ | $CO_2$ | $C_2H_4$ | $C_2H_6$ | Total |
| 0.4/3.8/0.1/0/1 | 0.088 | 0.274 | 0.033 | 0.091 | 0.486 |
| 0.4/3.8/0.1/0.005/1 | 0.035 | 0.134 | 0.026 | 0.053 | 0.248 |
| 0.4/3.8/0.1/0.01/1 | 0.032 | 0.122 | 0.023 | 0.046 | 0.223 |
| 0.4/3.8/0.1/0.02/1 | 0.030 | 0.115 | 0.020 | 0.042 | 0.207 |
| 0.4/3.8/0.1/0.05/1 | 0.031 | 0.110 | 0.017 | 0.037 | 0.195 |

TABLE 6-continued

| Composition | Amount of gas generated in battery (Unit: mL) | | | | |
|---|---|---|---|---|---|
| LiBF$_4$/EC/DAC/VEC/TEMA.TFSI | H$_2$ | CO$_2$ | C$_2$H$_4$ | C$_2$H$_6$ | Total |
| 0.4/3.8/0.1/0.1/1 | 0.030 | 0.111 | 0.016 | 0.038 | 0.195 |
| 0.4/3.8/0.1/0.2/1 | 0.030 | 0.116 | 0.019 | 0.043 | 0.208 |
| 0.4/3.8/0.1/0.3/1 | 0.028 | 0.123 | 0.021 | 0.055 | 0.227 |
| 0.4/3.8/0.1/0.5/1 | 0.029 | 0.162 | 0.036 | 0.072 | 0.299 |

From Table 6, it is seen that the amount of gas generation changed depending on the mixing ratio of the cyclic carbonate having a C=C unsaturated bond included in the non-aqueous electrolyte. The amount of the cyclic carbonate having a C=C unsaturated bond that is mixed with the non-aqueous electrolyte is preferably about 0.005 to 0.3 mol, with respect to 1 mol of the onium compound.

EXAMPLE 8A (i) Preparation of Non-Aqueous Electrolytes

Various cyclic carbonates having no C=C unsaturated bond, or a cyclic carboxylic acid ester was mixed with the non-aqueous electrolytes. The following were used as the cyclic carbonates having no C=C unsaturated bond and the cyclic carboxylic acid ester.

| EC: | ethylene carbonate |
|---|---|
| PC: | propylene carbonate |
| BC: | butylene carbonate |
| GBL: | γ-butyrolactone |

Non-aqueous electrolytes having compositions in molar ratio of LiBF$_4$/cyclic carbonate having no C=C unsaturated bond or cyclic carboxylic acid ester/DAC/VEC/P14.TFSI=0.1/0 or 0.1/0.1/0.1/1 were prepared, using P14.TFSI as the onium compound, DAC as the chain carbonate having a C=C unsaturated bond, VEC as the cyclic carbonate having a C=C unsaturated bond, and LiBF$_4$ as the lithium salt.

(ii) Assembly of Test Batteries

Test batteries were assembled in the same manner as in Example 3, except that the above-described non-aqueous electrolytes were used.

EXAMPLE 8B

Test batteries were assembled in the same manner as in Example 8A, except that VEC was not included in the non-aqueous electrolytes.

COMPARATIVE EXAMPLE 8A

Test batteries were assembled in the same manner as in Example 8A, except that DAC was not included in the non-aqueous electrolytes.

COMPARATIVE EXAMPLE 8B

Test batteries were assembled in the same manner as in Example 8A, except that both DAC and VEC were not included in the non-aqueous electrolytes.

Evaluation 8

The test batteries of Example 8A, Example 8B, Comparative Example 8A and Comparative Example 8B were subjected to charging/discharging at 20° C. with a constant current of 0.35 mA, with the upper limit voltage being set to 4.3 V and the lower limit voltage being set to 3.0 V. Then, the cycle degradation rate of each of the batteries was calculated based on Equations (1) and (2). The results are shown in Table 7.

Cycle degradation rate (%)=$A$×100/(9×Discharge capacity at 1st cycle)   Equation (1):

$A$=(Discharge capacity at 1st cycle)−(Discharge capacity at 10th cycle)   Equation (2):

TABLE 7

| | Cycle degradation rate (Unit: %) | | | |
|---|---|---|---|---|
| | Example 8A | Example 8B | Com. Ex. 8A | Com. Ex. 8B |
| EC | 1.3 | 1.5 | 1.8 | 3.1 |
| PC | 1.5 | 1.7 | 2.1 | 3.5 |
| BC | 1.6 | 1.9 | 2.3 | 3.8 |
| GBL | 1.4 | 1.6 | 2.1 | 3.7 |
| — | 2.7 | 3.0 | 3.9 | 6.4 |

From Table 7, it is seen that further mixing of the cyclic carbonate having no C=C unsaturated bond or the cyclic carboxylic acid ester with the non-aqueous electrolyte including the onium compound and the chain carbonate having a C=C unsaturated bond reduced the cycle degradation rate. It should be noted that addition of the cyclic carbonate having no C=C unsaturated bond or the cyclic carboxylic acid ester facilitates dissociation of the lithium salt, thus improving the ionic conductivity of the electrolyte. Therefore, it seems that the ion distribution in the battery could be favorably maintained even after repeated cycles, thus reducing the cycle degradation rate.

INDUSTRIAL APPLICABILITY

The non-aqueous electrolyte secondary battery according to the present invention uses a non-aqueous electrolyte that is constituted mainly by a room temperature molten salt having excellent flame resistance, and in which the decomposition of the non-aqueous electrolyte is highly suppressed, and it is therefore particularly useful for power sources for driving consumer electronic devices, portable device, cordless devices and the like, for which high reliability is required.

The invention claimed is:

1. A non-aqueous electrolyte secondary battery comprising a positive electrode, a negative electrode and a non-aqueous electrolyte,
    wherein said non-aqueous electrolyte includes an onium compound, a lithium salt and a non-cyclic carbonate having a C=C unsaturated bond,
    wherein said non-cyclic carbonate having a C=C unsaturated bond is at least one selected from the group consisting of diallyl carbonate and allyl phenyl carbonate,
    and wherein the amount of said non-cyclic carbonate having a C=C unsaturated bond is 0.01 to 0.5 mol per 1 mol of said onium compound.

2. The non-aqueous electrolyte secondary battery in accordance with claim 1,
wherein said onium compound is at least one selected from the group consisting of a chain quaternary ammonium compound, a pyrrolidinium compound and a piperidinium compound.

3. The non-aqueous electrolyte secondary battery in accordance with claim 1,
wherein said non-aqueous electrolyte further includes at least one selected from the group consisting of ethylene carbonate, propylene carbonate, butylene carbonate and γ-butyrolactone.

4. A non-aqueous electrolyte secondary battery comprising a positive electrode, a negative electrode and a non-aqueous electrolyte,
wherein said non-aqueous electrolyte includes an onium compound, a lithium salt, a non-cyclic carbonate having a C=C unsaturated bond, and a cyclic carbonate having a C=C unsaturated bond,
wherein said non-cyclic carbonate having a C=C unsaturated bond is at least one selected from the group consisting of diallyl carbonate and allyl phenyl carbonate, and
wherein the amount of said non-cyclic carbonate having a C=C unsaturated bond is 0.01 to 0.5 mol per 1 mol of said onium compound.

5. The non-aqueous electrolyte secondary battery in accordance with claim 4,
wherein said cyclic carbonate having a C=C unsaturated bond is at least one selected from the group consisting of vinyl ethylene carbonate, divinyl ethylene carbonate, phenyl ethylene carbonate and diphenyl ethylene carbonate.

6. The non-aqueous electrolyte secondary battery in accordance with claim 4,
wherein said onium compound is at least one selected from the group consisting of a chain quaternary ammonium compound, a pyrrolidinium compound and a piperidinium compound.

7. The non-aqueous electrolyte secondary battery in accordance with claim 4,
wherein said non-aqueous electrolyte further includes at least one selected from the group Consisting of ethylene carbonate, propylene carbonate, butylene carbonate and γ-butyrolactone.

* * * * *